(No Model.)
E. F. BARNES & L. C. STRICKLAND.
STEERING WHEEL.
No. 304,401. Patented Sept. 2, 1884.
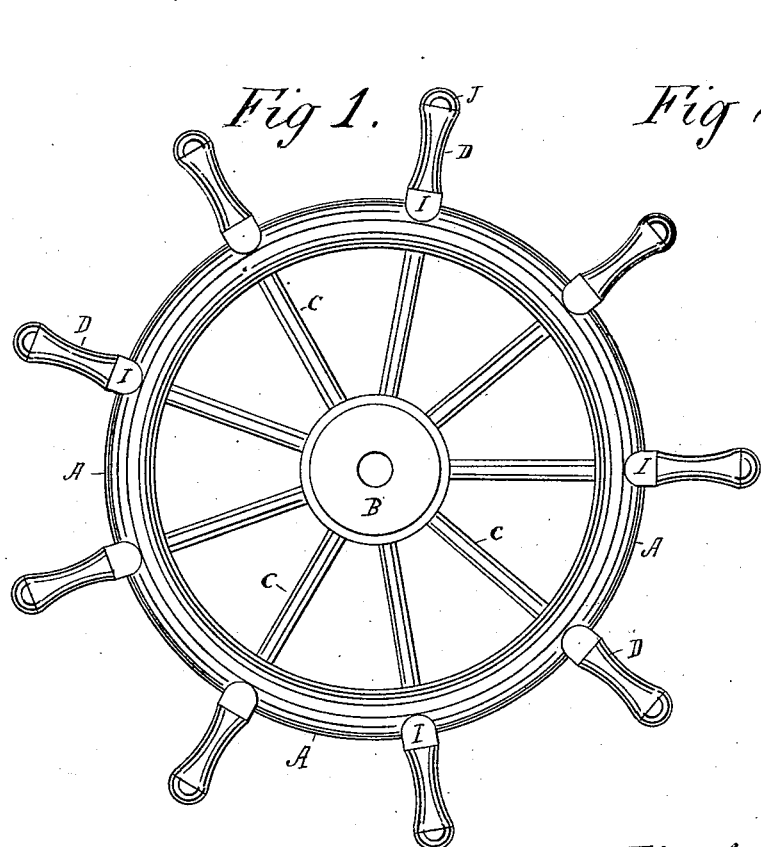
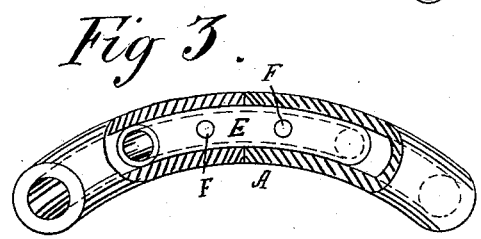
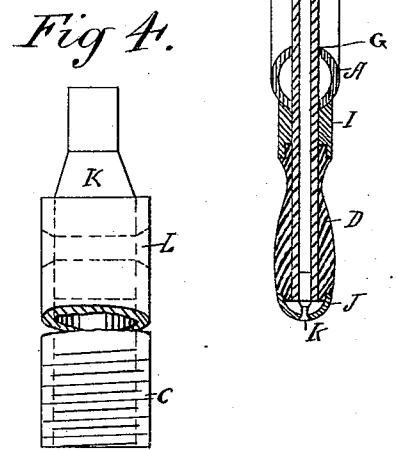
WITNESSES:
James D. King
Edward H. Rogers
INVENTOR
Elbridge F. Barnes
Lorenzo C. Strickland
By Geo. W. Seymour
ATTORNEY

UNITED STATES PATENT OFFICE.

ELBRIDGE F. BARNES AND LORENZO C. STRICKLAND, OF NEW HAVEN, CONN.

STEERING-WHEEL.

SPECIFICATION forming part of Letters Patent No. 304,401, dated September 2, 1884.

Application filed December 6, 1883. (No model.)

*To all whom it may concern:*

Be it known that we, ELBRIDGE F. BARNES and LORENZO C. STRICKLAND, citizens of the United States, residing at New Haven, in the county of New Haven and State of Connecticut, have invented certain new and useful Improvements in Steering-Wheels, of which the following is a specification, reference being had therein to the accompanying drawings.

Our invention relates to an improvement in metallic steering-wheels, the object being to produce a wheel combining cheapness and simplicity of construction with lightness, strength, and durability.

With these objects in view our invention consists in a metallic steering-wheel having a tubular rim through which the spokes of the wheel project.

Our invention further consists in certain details of construction and combinations of parts, as will be hereinafter described, and pointed out in the claims.

In the accompanying drawings, Figure 1 is a plan view of a wheel embodying our invention. Fig. 2 is a view thereof in central transverse section. Fig. 3 is a view of a section of the rim of the wheel, showing one mode of uniting its ends, and Fig. 4 is a detached broken view showing the inner and outer ends of one of the spokes.

Our improved metallic wheel consists, essentially, of a tubular rim, A, a hub, B, spokes C, and handles D. The said rim is composed of tubing bent into shape and having its ends united. As herein shown, this is done by sleeving them over a short section, E, of tubing, to which they are brazed, and also secured by rivets F.

The spokes C, herein shown as tubular, but not necessarily so, pass through radial holes G, formed in the rim of the wheel, and project beyond the same. The inner ends of the said spokes are threaded and screwed into tapped sockets H, formed in the hub. The outer ends of the spokes, which, as described, pass through and project beyond the rim, form cores, as it were, for the handles, which are preferably made of wood and drilled out to fit over the said ends of the spokes. The inner ends of the handles are fitted with ferrules I, conforming to the shape of the rim, while their outer ends are fitted with caps J. Plugs K, located in the projecting ends of the spokes, and secured therein by rivets L, are employed for securing the handles in place. For this purpose they may be upset, as shown in the drawings, or threaded and provided with nuts.

It is obvious that some changes in the details of the construction of the wheel may be made. We would therefore have it understood that we do not limit ourselves to the exact construction shown and described, but hold ourselves at liberty to make such changes and alterations as fairly fall within the spirit and scope of our invention.

Having fully described our invention, what we claim as new, and desire to secure by Letters Patent, is—

1. A metallic steering-wheel having a tubular rim, through which the spokes of the wheel project, substantially as set forth.

2. A metallic steering-wheel having a tubular rim, through which the spokes of the wheel project and form cores for the handles thereof, substantially as set forth.

3. A metallic steering-wheel having a tubular rim and tubular spokes, which latter project through the rim, substantially as set forth.

4. A metallic steering-wheel having a tubular rim, through which the spokes of the wheel project and form cores for the handles thereof, and means for securing the handles in place, substantially as set forth.

5. A metallic steering-wheel having a tubular rim, through which the spokes of the wheel project and form cores for the handles thereof, and plugs located in the projecting ends of the spokes for securing the handles in place, substantially as set forth.

6. A metallic steering-wheel having a tubular rim, the ends of which are sleeved over and secured to a short section of tubing, substantially as set forth.

In testimony whereof we have affixed our signatures in presence of two witnesses.

ELBRIDGE F. BARNES.
  LORENZO C. STRICKLAND.

Witnesses:
 CHARLES L. SWAN, Jr.,
 EDWARD H. ROGERS.